(12) United States Patent
Huang et al.

(10) Patent No.: US 11,031,229 B2
(45) Date of Patent: Jun. 8, 2021

(54) SAMPLE DESORPTION IONIZATION DEVICE AND ANALYSIS METHOD FOR A MASS SPECTROMETER

(71) Applicant: SHIMADZU RESEARCH LABORATORY (SHANGHAI) CO., LTD., Shanghai (CN)

(72) Inventors: Yunqing Huang, Shanghai (CN); Wenjian Sun, Shanghai (CN)

(73) Assignee: SHIMADZU RESEARCH LABORATORY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/756,239

(22) PCT Filed: Mar. 1, 2019

(86) PCT No.: PCT/CN2019/076662
§ 371 (c)(1),
(2) Date: Apr. 15, 2020

(87) PCT Pub. No.: WO2019/205805
PCT Pub. Date: Oct. 31, 2019

(65) Prior Publication Data
US 2020/0243319 A1    Jul. 30, 2020

(30) Foreign Application Priority Data

Apr. 27, 2018  (CN) .......................... 201810394496.3

(51) Int. Cl.
*H01J 49/16*       (2006.01)
*G01N 27/68*    (2006.01)
(Continued)

(52) U.S. Cl.
CPC ............ *H01J 49/164* (2013.01); *G01N 27/68* (2013.01); *H01J 49/049* (2013.01); *H01J 49/24* (2013.01)

(58) Field of Classification Search
CPC ........ H01J 49/164; H01J 49/049; H01J 49/24; H01J 49/0459; H01J 49/14; G01N 27/68; G01N 27/64
(Continued)

(56) References Cited

U.S. PATENT DOCUMENTS 7,525,105 B2    4/2009   Kovtoun
8,704,170 B2 *  4/2014   Kumashiro .......... G01N 27/622
                                                   250/288

(Continued)

FOREIGN PATENT DOCUMENTS

CN      102221576 A     10/2011
CN      103295873 A      9/2013

OTHER PUBLICATIONS

Takats, Zoltan et al., "Mass Spectrometry Sampling under Ambient Conditions with Desorption Electrospray Ionization", Science, 2004, pp. 471-473, vol. 306.
(Continued)

*Primary Examiner* — Nicole M Ippolito
(74) *Attorney, Agent, or Firm* — Tim Tingkang Xia, Esq.; Locke Lord LLP (57) ABSTRACT

The present disclosure provides a sample desorption ionization device and analysis method for a mass spectrometer. The device has a first gas pressure region and a second gas pressure region lower than the first gas pressure region. The device includes: a heating desorption device, carrying a sample and heating the sample, an analyte in the sample is desorbed from the sample under a heating action and then enters the first gas pressure region; a vacuum interface (Continued)

component, connected with the first gas pressure region and the second gas pressure region, and causing the analyte to enter the second gas pressure region from the first gas pressure region under the drive of a gas flow; and a soft ionization source, converting gas molecules in the second gas pressure region into activated gas molecules, the analyte entering the second gas pressure region realizes soft ionization after interacting with the activated gas molecules.

21 Claims, 3 Drawing Sheets

(51) Int. Cl.
  *H01J 49/04* (2006.01)
  *H01J 49/24* (2006.01)
(58) Field of Classification Search
  USPC .............................. 250/281, 282, 283, 288
  See application file for complete search history.

(56) References Cited

U.S. PATENT DOCUMENTS

| | | | |
|---|---|---|---|
| 2002/0011561 A1* | 1/2002 | Park | H01J 49/0404 250/288 |
| 2005/0151090 A1 | 7/2005 | Truche et al. | |
| 2006/0289747 A1* | 12/2006 | Schultz | H01J 49/40 250/294 |
| 2012/0312980 A1* | 12/2012 | Whitehouse | H01J 49/145 250/282 |
| 2013/0306856 A1* | 11/2013 | Trimpin | H01J 49/04 250/282 |

OTHER PUBLICATIONS

Cody, Robert B. et al., "Versatile New Ion Source for the Analysis of Materials in Open Air under Ambient Conditions", Anal. Chem., 2005, pp. 2297-2302, vol. 77.

Jecklin, Matthias Conradin et al., "Atmospheric pressure glow discharge desorption mass spectrometry for rapid screening of pesticides in food", Rapid Communications in Mass Spectrometry, 2008, pp. 2791-2798, vol. 22.

Wang Hua et al., "Desorption corona beam ionization source for mass spectrometry", Analyst, 2010, pp. 688-695, vol. 135.

Chen, Huanwen et al., "Surface desorption atmospheric pressure chemical ionization mass spectrometry for direct ambient sample analysis without toxic chemical contamination", Journal of Mass Spectrometry, 2007, pp. 1045-1056, vol. 42.

Steeb, Jennifer et al., "Beta electron-assisted direct chemical ionization (BADCI) probe for ambient mass spectrometry", Chem. Commun., pp. 4699-4701, vol. 31.

Coon, Joshua J. et al., "Atmospheric pressure laser desorption/chemical ionization mass spectrometry: a new ionization method based on existing themes", Rapid Communicatioins in Mass Spectrometry, Rapid Communications in Mass Spectrometry, 2002, pp. 681-685, vol. 16.

Basile, Franco et al., "Atmospheric pressure-thermal desorpton (P-TD)/electrospray ionization-mass spectrometry for the rapid analysis of Bascillus spores", Analyst, 2010, pp. 797-803, vol. 135.

SIPO (ISR/CN), "International Search Report and Written Opinion for PCT Application No. PCT/CN2019/076662", CN, dated Jun. 10, 2019.

* cited by examiner

SAMPLE DESORPTION IONIZATION DEVICE AND ANALYSIS METHOD FOR A MASS SPECTROMETER

TECHNICAL FIELD

The present disclosure relates to the technical field of mass spectrometry analysis, and in particular, to a method and an instrument for rapid mass spectrometry analysis as well as resolution, ionization and mass spectrometry analysis of samples without chromatographic separation.

BACKGROUND

The chromatography-mass spectrometry combined technology has high selectivity and high sensitivity, and has become the gold standard in the field of chemical analysis. However, the chromatography-mass spectrometry combined technology has the defects that the sample preparation is complicated and one analysis requires for a long time. In order to prepare samples with ease and removing chromatographic separation, direct mass spectrometry analysis methods have been rapidly developed since 2004. The critical point of the technology is it is a kind of Ambient Ionization methods. The most representative one is desorption electrospray ionization (DESI, *Science*, Vol. 306, p. 471, 2004) and direct real-time analysis (DART, *Analytical Chemistry*, Vol. 77, p. 2297, 2005). In the DESI technology, charged droplets formed by gas-assisted electrospray were sprayed onto the surface of a sample, the charged droplets interact with an analyte in the sample, the desorption and the ionization of the analyte are realized simultaneously. The charged droplets reflected from the surface of the sample are desolvated, and the charged molecules enter mass analyzers through a vacuum interface of a mass spectrometer and are further detected by a detector. Similar to DESI, analyte desorption and ionization in the DART technology occur simultaneously. The difference is that the used energy carriers are activated gas molecules generated by discharge, rather than the charged droplets. Because analyte desorption and ionization occur simultaneously, technologies such as DESI and DART are commonly referred to as a one-step ionization method Similar technologies also include atmospheric pressure glow discharge (APGD, *Rapid Commun. Mass Spectrom.*, Vol. 22, p. 2791, 2008), desorption corona beam ionization (DCBI, *Analyst*, Vol. 135, p. 688, 2010), and desorption atmospheric pressure chemical ionization (DAPCI, *J. Mass Spectrom.*, Vol. 42, p. 1045, 2007), etc.

Although the one-step ionization method has the advantage of simple structure, the energy carrier having an ionization effect loses the ionization capability during the interaction with the sample, which causes reduction in ionization efficiency. Furthermore, the desorption mode is also limited by the used energy carrier, which restricts the applicable range of the one-step ionization method. As an improvement, a two-step ionization method is invented, in which desorption and ionization are performed in two steps without interfering with each other. Gas thermal desorption-β-electron assisted chemical ionization (BADCI, *Chem. Commun.*, Vol. 31, p. 4699, 2009) and laser desorption electrospray ionization (LD-ESI, U.S. Pat. No. 7,525,105) are two representative two-step ionization methods. The former uses the heated gas for desorption, and the analyte desorbed from the sample enters the mass spectrometer for detecting after β-electron-assisted chemical ionization at the atmospheric pressure. The latter uses a laser light to desorb the analyte from the sample, and the analyte desorbed from the sample is ionized by charged droplets formed by electrospray at the atmospheric pressure, and then enters the mass spectrometer for detecting. Two-step ionization technologies similar to BADCI and LD-ESI also include atmospheric pressure laser desorption chemical ionization (AP-LD/CI, *Rapid Commun. Mass Spectrom.*, Vol. 16, p. 681, 2002) and atmospheric thermal desorption electrospray ionization (TD-ESI, *Analyst*, Vol. 135, p. 797, 2010), etc. U.S. Pat. No. 8,704,170 discloses another two-step ionization technology which adopts a scheme of atmospheric desorption and low pressure ionization. However, this method fails to obtain the optimal gas pressure in the ionization region to realize soft ionization of weakly polar to polar substances.

In the above one-step ionization method and two-step ionization method, the desorption and the ionization occur at the atmospheric pressure. These schemes have the following defects: 1) analyte ions generated at the atmospheric pressure need to pass through a vacuum interface and suffer loss due to colliding with the interface wall at the vacuum interface, resulting in reduced sensitivity; 2) it failed to obtain appropriate conditions for ionization processes to realize soft ionization of weakly polar analytes (such as alkanes and halogenated alkanes) and polar analytes.

SUMMARY

In view of the defects of the prior art described above, the present disclosure provides a sample desorption and ionization device, and a mass spectrometer and an analysis method applying the same.

The present disclosure provides a sample desorption and ionization device having a first gas pressure region and a second gas pressure region, a gas pressure in the first gas pressure region is higher than a gas pressure in the second gas pressure region. The device comprises: a heating desorption device, disposed in the first gas pressure region and carrying a sample and heating the sample, an analyte in the sample is desorbed from the sample under a heating action and then enters the first gas pressure region; a vacuum interface component connected with the first gas pressure region and the second gas pressure region and causing the analyte to enter the second gas pressure region from the first gas pressure region under a drive of a gas flow; and a soft ionization source converting gas molecules in the second gas pressure region into activated gas molecules, so that the analyte, entering the second gas pressure region, realizes soft ionization after interacting with the activated gas molecules, the gas pressure in the second gas pressure region is 50-350 Pa.

In an embodiment of the present disclosure, the heating desorption device heats the sample by adopting hot solid surface assisted desorption or hot gas assisted desorption.

In an embodiment of the present disclosure, the heating desorption device desorbs the analyte from the sample directly ivia thermal desorption by adopting a heating block, a heating tray, a heating rod or heating wires.

In an embodiment of the present disclosure, the heating desorption device adopts a combination of a sample tray and a gas heater aligned to the sample tray, and the sample is in contact with the gas heated by the gas heater to realize thermal desorption of the analyte.

In an embodiment of the present disclosure, the heating desorption device adopts a laser device, and the sample is in contact with a laser light emitted by the laser device to realize photodesorption of the analyte.

In an embodiment of the present disclosure, the heating desorption device heats the sample based on temperature programming.

In an embodiment of the present disclosure, the vacuum interface component comprises a metal tube and a metal sleeve, where one end of the metal tube is disposed in the first gas pressure region, the other end of the metal tube is inserted in one end of the metal sleeve and extends into the metal sleeve, the other end of the metal sleeve has an opening, and the second gas pressure region is in a barrel of the metal sleeve.

In an embodiment of the present disclosure, the vacuum interface component further includes an insulating sleeve, where the insulating sleeve is disposed between the metal tube and the metal sleeve to isolate the metal tube from the metal sleeve, and the metal sleeve is connected with a casing of the device to realize grounding.

In an embodiment of the present disclosure, the soft ionization source adopts a glow discharge ionization source.

In an embodiment of the present disclosure, the soft ionization source adopts a radiation ionization source, a sleeve wall of the metal sleeve includes an opening for rays of the radiation ionization source to enter, and the rays enter an inside of the metal sleeve through the opening and then enter the second gas pressure region.

In an embodiment of the present disclosure, the vacuum interface component comprises a quartz tube and a quartz sleeve, where one end of the quartz tube is disposed in the first gas pressure region, the other end of the quartz tube is inserted in one end of the quartz sleeve and extends into the quartz sleeve, the other end of the quartz sleeve has an opening, and the second gas pressure region is in a barrel of the quartz sleeve.

In an embodiment of the present disclosure, the soft ionization source adopts a dielectric barrier discharge ionization source.

In an embodiment of the present disclosure, the soft ionization source adopts a radiation ionization source, a sleeve wall of the quartz sleeve includes an opening for rays of the radiation ionization source to enter, and the rays enter an inside of the quartz sleeve through the opening and then enter the second gas pressure region.

In an embodiment of the present disclosure, a gas pressure in the second gas pressure region is adjusted by adjusting a size of the opening of the metal sleeve.

In an embodiment of the present disclosure, a gas pressure in the second gas pressure region may be adjusted by adjusting a size of the opening of the quartz sleeve.

In an embodiment of the present disclosure, a gas in the first gas pressure region contains oxygen or ozone, and the oxygen or the ozone may enter the second gas pressure region with the gas flow.

In an embodiment of the present disclosure, the gas pressure in the first gas pressure region adopts: $1/10$ atmospheric pressure to $1/5$ atmospheric pressure, $1/5$ atmospheric pressure to $1/4$ atmospheric pressure, $1/4$ atmospheric pressure to $1/3$ atmospheric pressure, $1/3$ atmospheric pressure to $1/2$ atmospheric pressure, or $1/2$ atmospheric pressure to 1 atmospheric pressure.

In an embodiment of the present disclosure, the gas pressure in the second gas pressure region adopts: 50-100 Pa, 100-150 Pa, 150-200 Pa, 200-250 Pa, 250-300 Pa or 300-350 Pa.

In order to achieve the above object and other related objects, the present disclosure provides a mass spectrometer, comprising any one of the above sample desorption and ionization device, an ion guiding vacuum chamber, ion guiding devices, mass analyzers and an ion detector, where one end of a second gas pressure region is communicated with the ion guiding vacuum chamber, and a gas pressure in the second gas pressure region is not less than a gas pressure in the ion guiding vacuum chamber.

In an embodiment of the present disclosure, the gas pressure in the second gas pressure region is adjusted by adjusting a size of an opening of a metal sleeve or a size of an opening of a quartz sleeve, when the opening becomes large, the gas pressure in the second gas pressure region gradually tends to the gas pressure in the ion guiding vacuum chamber; and when the opening becomes small, a value of the gas pressure in the second gas pressure region gradually increases.

In order to achieve the above object and other related objects, the present disclosure provides a sample desorption and ionization method applied to any one of the above sample desorption and ionization device. The method includes: heating a sample disposed in a first gas pressure region, an analyte in the sample is desorbed from the sample under a heating action and then enters the first gas pressure region; enabling the analyte to enter a second gas pressure region from the first gas pressure region under a drive of a gas flow, a gas pressure in the first gas pressure region is higher than a gas pressure in the second gas pressure region; and converting gas molecules in the second gas pressure region into activated gas molecules, the analyte entering the second gas pressure region realizes soft ionization after interacting with the activated gas molecules.

In order to achieve the above object and other related objects, the present disclosure provides a sample analysis method based on the above mass spectrometer, including: heating a sample in a first gas pressure region, an analyte in the sample is desorbed from the sample under a heating action and then enters the first gas pressure region; enabling the analyte to enter a second gas pressure region from the first gas pressure region under a drive of a gas flow, a gas pressure in the first gas pressure region is higher than a gas pressure in the second gas pressure region; converting gas molecules in the second gas pressure region into activated gas molecules, the analyte, entering the second gas pressure region, realizes soft ionization after interacting with the activated gas molecules, the gas pressure in the second gas pressure region is 50-350 Pa; and enabling ions of the analyte to enter the ion guide device under an action of a gas flow and an electric field, and then, screening the ions by the mass analyzers to reach an ion detector for analysis.

As mentioned above, the sample desorption and ionization device, and the mass spectrometer and analysis method applying the same in the present disclosure may significantly improve the ionization efficiency of mass spectrometry analysis and broaden the applicable range of analytes.

DETAILED DESCRIPTION OF THE PREFERRED EMBODIMENTS

The following describes the embodiments of the present disclosure through specific examples. A person skilled in the art can easily understand other advantages and effects of the present disclosure from the content disclosed in this specification. The present disclosure may also be implemented or applied through different specific embodiments. Various details in this specification may also be modified or changed based on different viewpoints and applications without departing from the spirit of the present disclosure. It should be noted that the embodiments below and features in the embodiments can be combined with each other in the case of no conflict.

It should be noted that the drawings provided in the following embodiments only exemplify the basic idea of the present disclosure. Therefore, only the components related to the present disclosure are shown in the drawings, and are not drawn according to the quantity, shape, and size of the components during actual implementation. During actual implementation, the type, quantity, and proportion of the components may be changed, and the layout of the components may be more complicated.

The present embodiment provides a sample desorption and ionization device. The device includes a first gas pressure region and a second gas pressure region. The gas pressure in the first gas pressure region may adopt: $\frac{1}{10}$ atmospheric pressure to $\frac{1}{5}$ atmospheric pressure, $\frac{1}{5}$ atmospheric pressure to $\frac{1}{4}$ atmospheric pressure, $\frac{1}{4}$ atmospheric pressure to $\frac{1}{3}$ atmospheric pressure, $\frac{1}{3}$ atmospheric pressure to $\frac{1}{2}$ atmospheric pressure, or $\frac{1}{2}$ atmospheric pressure to 1 atmospheric pressure. Correspondingly, the gas pressure in the second gas pressure region is preferably 50-350 Pa, and specifically may adopt: 50-100 Pa, 100-150 Pa, 150-200 Pa, 200-250 Pa, 250-300 Pa, or 300-350 Pa. In particular, the gas pressure in the first gas pressure region should be higher than the gas pressure in the second gas pressure region.

The device is mainly composed of three parts: a heating desorption device, a vacuum interface component and a soft ionization source. These three parts will be described in detail below.

The heating desorption device is disposed in the first gas pressure region. The heating desorption device carries and heats the sample, so that an analyte in the sample is desorbed from the sample under heating and then enters the first gas pressure region. Specifically, the heating desorption device heats the sample by adopting hot solid surface assisted desorption or hot gas assisted desorption. For example, the heating desorption device desorbs the analyte from the sample directly through thermal desorption by adopting a heating block, a heating tray, a heating rod or heating wires. In another example, the heating desorption device adopts a combination of a sample tray and a gas heater aligned to the sample tray, and the sample is in contact with a gas heated by the gas heater to realize thermal desorption of the analyte. In another embodiment, the heating desorption device may also adopt a laser device, and the sample is in contact with a laser light emitted by the laser device to realize photodesorption of the analyte. Preferably, the heating desorption device heats the sample based on temperature programming, thereby accurately controlling the heating temperature.

The vacuum interface component connects the first gas pressure region and the second gas pressure region (the first gas pressure region and the second gas pressure region are isolated from each other, and are communicated with each other only through the vacuum interface component). The vacuum interface component enables the analyte to enter the second gas pressure region from the first gas pressure region under a drive of a gas flow. Specifically, the vacuum interface component mainly adopts a combination of a metal tube and a metal sleeve, or a combination of a quartz tube and a quartz sleeve. If the vacuum interface component adopts the combination of metal tube and metal sleeve, one end of the metal tube is disposed in the first gas pressure region, the other end of the metal tube is inserted in one end of the metal sleeve and extends into the metal sleeve, the other end of the metal sleeve is an opening, and the second gas pressure region is inside the metal sleeve. If the vacuum interface component adopts the combination of quartz tube and quartz sleeve, one end of the quartz tube is disposed in the first gas pressure region, the other end of the quartz tube is inserted in one end of the quartz sleeve and extends into the quartz sleeve, the other end of the quartz sleeve is an opening, and the second gas pressure region is inside the quartz sleeve. In another embodiment, the vacuum interface component adopting the combination of metal tube and metal sleeve further includes an insulating sleeve, the insulating sleeve is disposed between the metal tube and the metal sleeve to isolate the metal tube from the metal sleeve, and the metal sleeve is connected with a casing of the device to realize grounding.

It is worth mentioning that the gas pressure in the second gas pressure region may be adjusted by adjusting the size of the opening of the metal sleeve. For example, when the opening gradually becomes large, the gas pressure in the second gas pressure region gradually tends to the external gas pressure. When the opening gradually becomes small, the gas pressure in the second gas pressure region gradually increases.

The soft ionization source converts gas molecules in the second gas pressure region into activated gas molecules, so that the analyte entering the second gas pressure region realizes soft ionization after interacting with the activated gas molecules. For the vacuum interface component composed of the metal tube and the metal sleeve, the soft ionization source may be a radiation ionization source. At this time, the sleeve wall of the metal sleeve has an opening for rays of the radiation ionization source to enter. The rays enter the metal sleeve through the opening and then enter the second gas pressure region. For the vacuum interface component composed of quartz tube and quartz sleeve, the soft ionization source may be a radiation ionization source or a dielectric barrier discharge ionization source. If the radiation ionization source is used, the sleeve wall of the quartz sleeve needs to have an opening for rays of the radiation ionization source to enter, and the rays enter the quartz sleeve through the opening and then enter the second gas pressure region. If the dielectric barrier discharge ionization source is used, a pair of metal electrodes are disposed at a periphery of the quartz sleeve, and dielectric barrier discharge of the second gas pressure region is realized by applying a radio-frequency high voltage to the metal electrodes, so that the gas molecules in the second gas pressure region are converted into activated gas molecules. In another embodiment, for the vacuum interface component composed of the metal tube, the metal sleeve and the insulating sleeve, the soft ionization source may adopt a radiation ionization source or a glow discharge ionization source. If the radiation ionization source is adopted, the sleeve wall of the metal sleeve is required to have an opening for rays of the radiation ionization source to enter, and the rays enter the metal sleeve through the opening and then enter the second gas pressure region. If the glow discharge ionization source is adopted, the metal tube is electrified to form potential difference with the metal sleeve to enable the second gas pressure region to realize glow discharge, so that the gas molecules in the second gas pressure region are converted into activated gas molecules.

Preferably, the gas in the first gas pressure region contains oxygen or ozone. The oxygen or the ozone may enter the second gas pressure region with the gas flow, thereby improving the ionization efficiency of the glow discharge, dielectric barrier discharge or radiation ionization to the analyte.

Due to the limited space, structures of two preferred sample desorption and ionization devices and realization processes of desorption and ionization are mainly introduced with reference to the drawings below.

Figure 1:
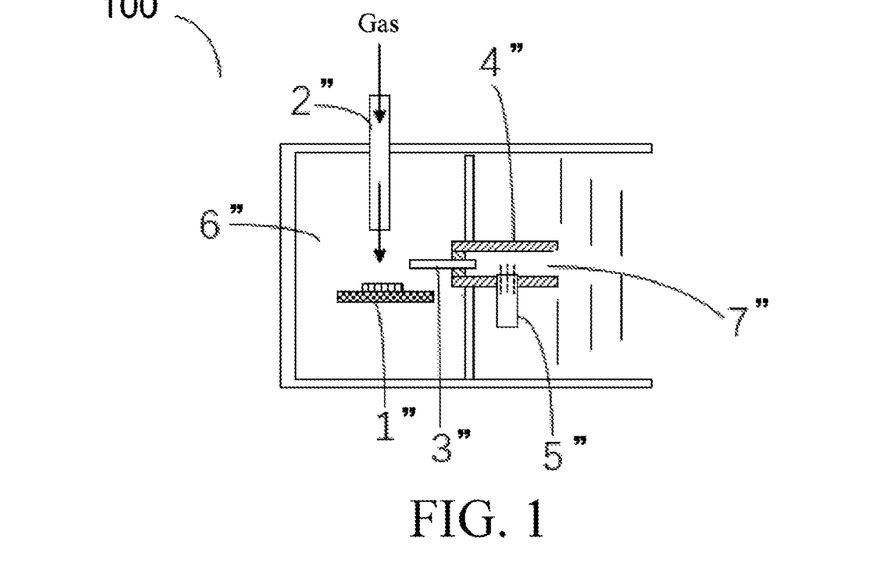
FIG. 1 is a schematic diagram showing cross-section of a sample desorption and ionization device according to an embodiment of the present disclosure.

Referring to FIG. 1, FIG. 1 shows an exemplary sample desorption and ionization device 100. The device 100 comprises a sample tray 1", a gas heater 2", a metal tube 3" used as a vacuum interface of a mass spectrometer, a metal sleeve 4", a radioactivated source 5", a low gas pressure region 7" in the metal sleeve 4", and a high gas pressure region 6" in a front end of the metal tube 3". The low gas pressure region 7" is connected with the high gas pressure region 6" through the metal tube 3". As a preferred scheme, the gas pressure in the low gas pressure region 7" is maintained at 50-350 Pa. β-rays emitted by the radioactivated source 5" enter the low gas pressure region 7" through the opening in the outer wall of the metal sleeve 4" and interact with a background gas in the low gas pressure region 7", so that gas molecules in the low gas pressure region 7" are converted into activated gas molecules.

The processes of performing sample desorption and ionization by using the device 100 include: a sample is put on a surface of the sample tray 1"; the gas heater 2" is aligned to a sample region, the gas flow and gas heater 2" is turned on, hot gas is blown onto the sample, and the analyte in the sample is desorbed from the sample under an action of the hot gas and enters the high gas pressure region 6"; the analyte enters the low gas pressure region 7" through the metal tube 3" under a drive of gas flow; and the analyte interacts with the activated gas molecules in the low gas pressure region 7", thereby realizing soft ionization.

As a preferred scheme, a gas in the high gas pressure region 6" contains oxygen or ozone, and the oxygen or the ozone enters the low gas pressure region 7" with the gas flow, thereby improving the ionization efficiency of radiation ionization to the analyte.

Figure 2:
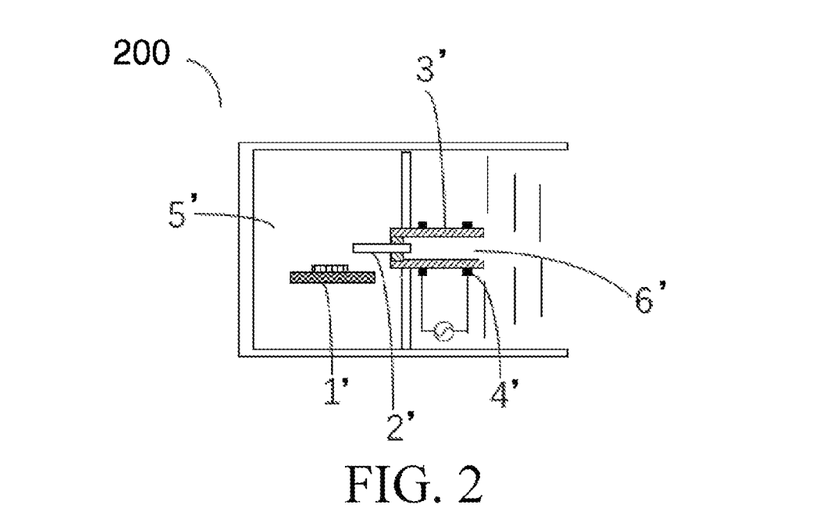
FIG. 2 is a schematic diagram showing cross-section of a sample desorption and ionization device according to another embodiment of the present disclosure.

Referring to FIG. 2, FIG. 2 shows an exemplary sample desorption and ionization device 200. The device 200 includes a heatable sample tray 1', a quartz tube 2' used as a vacuum interface of a mass spectrometer, a quartz sleeve 3', a pair of metal electrodes 4' wrapping a periphery of the quartz sleeve 3', a low gas pressure region 6' in the quartz sleeve 3', and a high gas pressure region 5' in a front end of the quartz tube 2'. The low gas pressure region 6' is connected with the high gas pressure region 5' through the quartz tube 2'. As a preferred scheme, the gas pressure in the low gas pressure region 6' is maintained at 50-350 Pa. Dielectric barrier discharge of the low gas pressure region 6' may be realized by applying a radio-frequency high voltage to the metal electrodes 4', so that gas molecules in the low gas pressure region 6' are converted into activated gas molecules.

The processes of performing sample desorption and ionization by using the device 200 as shown in FIG. 2 include: a sample is put on a surface of the sample tray 1'; the sample tray 1' is heated, and the analyte in the sample is desorbed from the sample under a heating action and then enters the high gas pressure region 5'; the analyte enters the low gas pressure region 6' through the quartz tube 2' under the drive of a gas flow; and the analyte interacts with the activated gas molecules in a dielectric barrier discharge region, thereby realizing soft ionization.

As a preferred scheme, a gas in the high gas pressure region 5' contains oxygen or ozone, and the oxygen or the ozone enters the low gas pressure region 6' with the gas flow, thereby improving the ionization efficiency of the dielectric barrier discharge to the analyte.

The present disclosure provides a mass spectrometer, including any one of the above sample desorption and ionization device, an ion guiding vacuum chamber, ion guiding devices, mass analyzers and an ion detector. One end of the second gas pressure region is communicated with the ion guiding vacuum chamber, and the gas pressure in the second gas pressure region is not less than a gas pressure in the ion guiding vacuum chamber.

In an embodiment, the gas pressure in the second gas pressure region may be adjusted by adjusting the size of the opening of the metal sleeve or the size of the opening of the quartz sleeve. For example, when the opening gradually becomes large, the gas pressure in the second gas pressure region gradually tends to the gas pressure in the ion guiding vacuum chamber. When the opening gradually becomes small, the gas pressure in the second gas pressure region gradually increases.

Due to the limited space, a structure of a preferred mass spectrometer and sample analysis processes based on the mass spectrometer are mainly introduced with reference to the drawings below.

Figure 3:
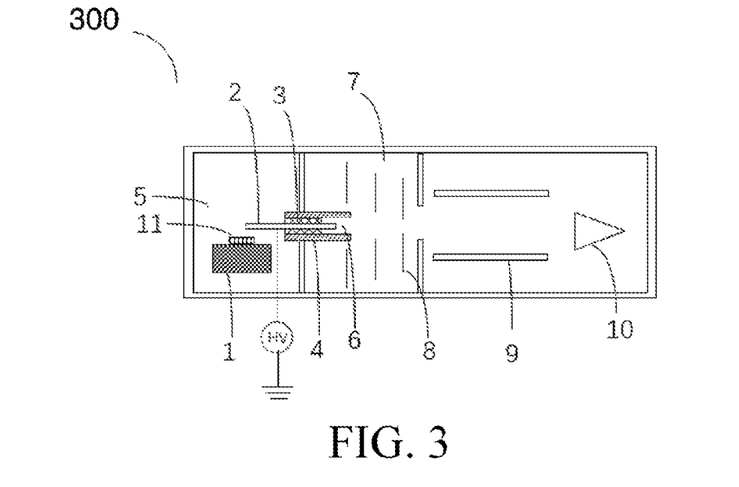
FIG. 3 is a schematic diagram showing cross-section of a mass spectrometer according to an embodiment of the present disclosure.

Referring to FIG. 3, FIG. 3 shows an exemplary mass spectrometer 100. The mass spectrometer 100 includes a heating block 1, a metal tube 2 used as a vacuum interface of a mass spectrometer, an insulating sleeve 3, a metal sleeve 4, a low gas pressure region 6 in the metal sleeve 4, a high gas pressure region 5 in a front end of the metal tube 2, an ion guiding vacuum chamber 7, ion guiding devices 8, quadrupole mass analyzers 9 and an ion detector 10. The insulating sleeve 3 isolates the metal tube 2 from the metal sleeve 4, so that the metal tube 2 and the metal sleeve 4 are at different potentials. As a preferred scheme, a DC high voltage (200-2000 V) or an AC high voltage (200-2000 V, 1 kHz-10 MHz) are applied to the metal sleeve 4, and the metal sleeve 4 is connected with a casing to realize grounding. Under an action of a potential difference between the metal tube 2 and the metal sleeve 4, the low gas pressure region 6 may realize glow discharge, so that gas molecules in the low gas pressure region 6 are converted into activated gas molecules. As a preferred scheme, a gas pressure in the low gas pressure region 6 is maintained at 50-350 Pa. The low gas pressure region 6 is connected with the ion guide 7 through an opening in one end of the metal sleeve 4, and the gas pressure in the low gas pressure region 6 may be adjusted according to a size of the opening in one end of the metal sleeve 4. When the opening is large, the gas pressure in the low gas pressure region 6 is approximately equal to a gas pressure in the ion guiding vacuum chamber 7. The gas pressure in the low gas pressure region 6 may be gradually increased by reducing the size of the opening. In order to improve the efficiency of high-boiling-point analytes passing through the metal tube, it is usually necessary to heat the metal tube to a suitable temperature (200-600° C.). The heating may be realized by a direct heating mode of applying a current to the metal tube 2, or an indirect heating mode of contacting the metal tube 2 with a heat source. As a preferred scheme, the ion guiding device 8 is an ion guiding device based on a quadrupole field, and an optimal working gas pressure of the ion guide device 8 is 100-500 Pa.

The processes of performing sample analysis by using a mass spectrometer 300 as shown in FIG. 3 includes: a sample 11 is put on a surface of a heating block 1 before the heating block 1 is not turned on; then the heating block 1 is turned on, a temperature of the heating block 1 increases rapidly, the analyte in the sample 11 is desorbed from the sample under a heating action and then enters the high gas pressure region 5; the analyte enters the low gas pressure region 6 through a metal tube 2 under a drive of a gas flow; the analyte interacts with activated gas molecules in a glow discharge region, thereby realizing soft ionization; ions of the analyte enter the ion guide devices 8 under an action of the gas flow and an electric field, and then, the ions are transmitted and gathered through the ion guide devices 8 to reach the quadrupole mass analyzers 9; and the ions are screened by the quadrupole mass analyzers to reach a detector 10 for analysis.

As a preferred scheme, a gas in the high gas pressure region 5 contains oxygen or ozone, and the oxygen or the ozone enters the low gas pressure region 6 with the gas flow, thereby improving the ionization efficiency of glow discharge to the analyte.

Figure 4:
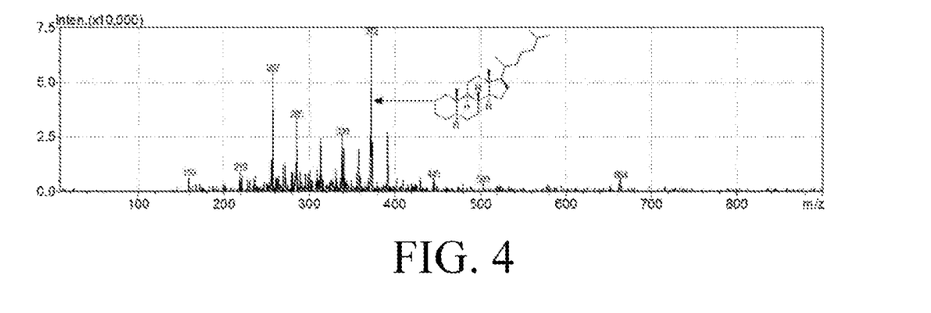
FIG. 4 is a mass spectrogram obtained by analyzing cholestane added to soil by using a mass spectrometer with the device as shown in FIG. 1.

FIG. 4 is a mass spectrogram obtained by analyzing cholestane added to soil by using a mass spectrometer having the device as shown in FIG. 1. Cholestane-added soil particles (1 μg/g) are put on the sample tray 1", the radio-activated source 5" is in a normally open state, the radio-activated source is a β-ray source. Mass analyzers and a detector of a mass spectrometer are turned on, the mass analyzers work in a mass scanning mode, the detector is in a positive ion working mode. Voltage values of other ionic optical components of the mass spectrometer are set to be the values facilitating the passage of positive ions. The gas pressure in the low pressure region 7" is 200 Pa, the gas pressure in the high pressure region 6" is atmospheric pressure. The gas source and gas heating source 2" is turned on, the gas used is ozone-containing air, and the gas flow rate is 2 L/min.

Experimental results show that the cholestane in the soil is successfully ionized and detected, the results are shown in FIG. 4, and the mass-to-charge ratio of a molecular ion peak of the cholestane is m/z 372. The above radiation ionization occurs in the low gas pressure region 7", the β-ray source activates the background gas in the low gas pressure region 7", and the analyte interacts with activated background gas molecules to realize soft ionization.

It should be noted that the gas pressure in the low gas pressure region 7" should be greater than 50 Pa. If the gas pressure in the low gas pressure region 7" is too low, high-energy β-rays will directly interact with the analyte, enabling the analyte to be ionized and cracked at the same time, so that soft ionization of the analyte cannot be realized, and the soft ionization of the analyte is further difficult.

Figure 5:
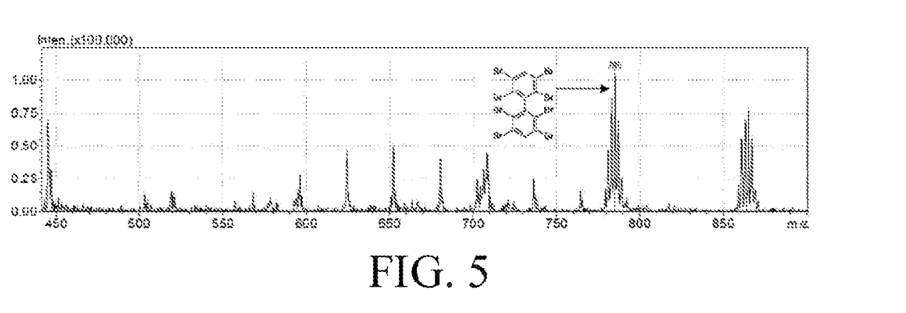
FIG. 5 is a mass spectrogram obtained by analyzing octabromo-diphenyl in plastic by using a mass spectrometer with the device as shown in FIG. 2.

FIG. 5 is a mass spectrogram obtained by analyzing octabromo-diphenyl in plastic by using a mass spectrometer having the device as shown in FIG. 2. A hard plastic block in which octabromo-diphenyl flame retardant is added is polished with abrasive paper. A small amount of polished plastic particles are put on the sample tray 1'. The high-voltage radio-frequency power source connected with the electrode 4' is turned on to generate dielectric barrier discharge in a low gas pressure region. The radio-frequency voltage is 200-10000 V/1-1000 kHz. Mass analyzers and a detector of the mass spectrometer are turned on, the mass analyzers work in a mass scanning mode, the detector is in a positive ion working mode. Voltage values of other ionic optical components of the mass spectrometer are set to be values facilitating the passage of positive ions. The gas pressure in the low pressure region 6' is 300 Pa, the gas pressure in a high pressure region 5' is ¼ atmospheric pressure. The sample tray 1' is heated.

Experimental results show that the octabromo-diphenyl in the plastic particles is successfully detected, the results are shown in FIG. 5, and a mass-to-charge ratio of a molecular ion peak of the octabromo-diphenyl is m/z 785. The above dielectric barrier discharge occurs in the low gas pressure region 6', the dielectric barrier discharge activates the background gas in the low gas pressure region 6', and the analyte interacts with activated background gas molecules to realize soft ionization.

It should be noted that the gas pressure in the low gas pressure region 6' should be greater than 50 Pa. If the gas pressure in the low gas pressure region 6' is significantly less than 50 Pa, the activity of the background gas in the low gas pressure region 6' is significantly increased, so that the analyte is ionized and cracked at the same time, soft ionization of the analyte cannot be realized, and the soft ionization of the analyte is further difficult.

Figure 6:
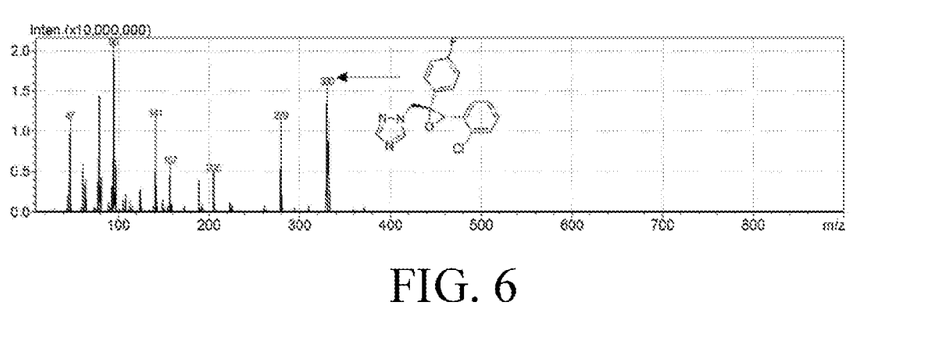
FIG. 6 is a mass spectrogram obtained by analyzing epoxiconazole in apple peel by using the mass spectrometer as shown in FIG. 3.

FIG. 6 is a mass spectrogram obtained by analyzing epoxiconazole in apple peel by using the mass spectrometer as shown in FIG. 3. Epoxiconazole solution (1 μg/mL, 50% ethanol) is uniformly sprayed to the surface of an apple, the apple is placed at room temperature for 2 hours. After the solution on the surface of the apple is volatilized, a small piece of apple peel is cut and put on the heating block 1. The power source applied to a metal tube 2 is turned on to generate glow discharge in a low gas pressure region 6. The discharge current is 0.5-2 Ma, The voltage applied may be a DC high voltage of 400-600 V or an AC voltage of 400-800 V/10-1000 kHz. Mass analyzers 9 and a detector 10 are turned on, the mass analyzers 9 work in a mass scanning mode, the detector 10 is in a positive ion working mode. The voltage values of other ionic optical components of the mass spectrometer are set to be the values facilitating the passage of positive ions. The gas pressure in the vacuum chamber 7 is 100 Pa, the gas pressure in the low pressure region 6 is 300 Pa, and the gas pressure in the high pressure region 5 is indoor atmospheric pressure. Then the heating block is turned on, and the heating block is set to be of a temperature programming mode: 0-10 s, 25-300° C.; 10-30 s, 400-400° C.; 30-40 s, 400-1000° C.; 40-60 s, 1000-25° C. The mass-to-charge ratio of the molecular ion peak generated by the epoxiconazole in the soft ionization source is m/z 330.

Experimental results show that the epoxiconazole in the apple is successfully detected, the time at which the strength reaches a maximum value is 36 s, and the corresponding temperature is 760° C. The above glow discharge occurs in the low gas pressure region 6, the glow discharge activates the background gas in the low gas pressure region 6, and the analyte interacts with activated background gas molecules to realize soft ionization.

It should be noted that the gas pressure in the low gas pressure region 6 should be greater than 50 Pa. If the gas pressure in the low gas pressure region 6 is significantly less than 50 Pa, the activity of the background gas in the low gas pressure region 6 is significantly increased, so that the analyte is ionized and simultaneously cracked, soft ionization of the analyte may not be realized, and the soft ionization of the analyte is further difficult.

Figure 7:
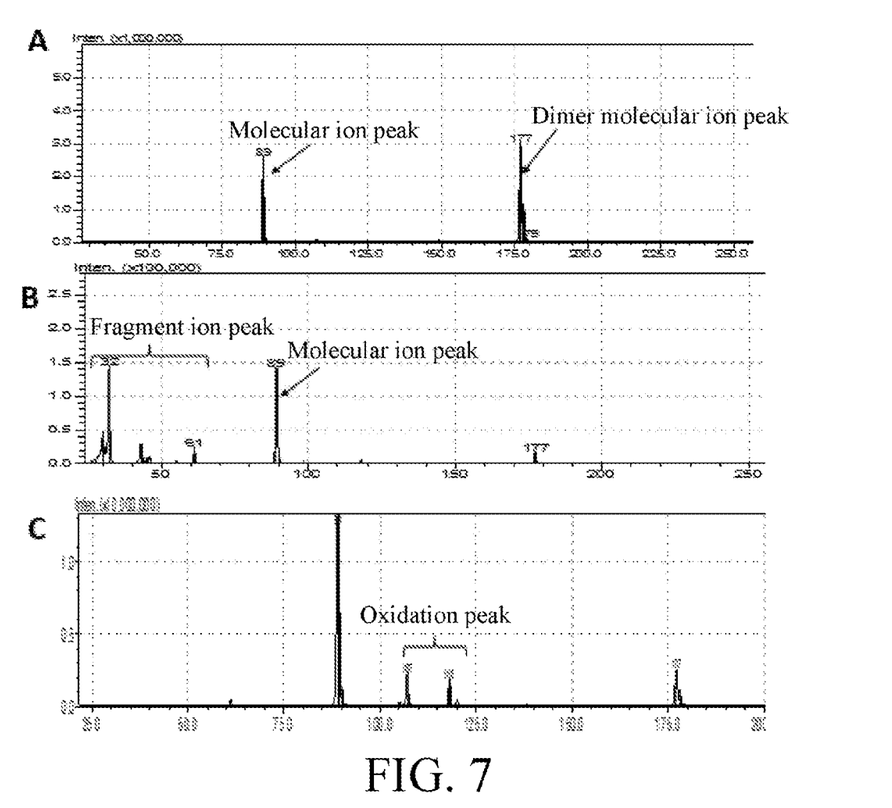
FIG. 7 is a mass spectrogram obtained by ionizing ethyl acetate vapor under different gas pressures by using the mass spectrometer as shown in FIG. 3.

FIG. 7 is a mass spectrogram obtained by ionizing ethyl acetate vapor under different gas pressures by using the device as shown in FIG. 3. FIG. 7A is a mass spectrogram obtained when a gas pressure in an ionization region is 50-350 Pa, and the mass spectrogram is mainly based on a molecular ion peak and a dimer molecular ion peak. FIG. 7B is a mass spectrogram obtained when the gas pressure in the ionization region is less than 50 Pa, the mass spectrogram includes a molecular ion peak and a large number of fragment ion peaks. FIG. 7C is a mass spectrogram obtained when the gas pressure in the ionization region is greater than 350 Pa, the mass spectrogram has stronger oxidation peaks (molecular ion peaks added with oxygen atoms) besides a molecular ion peak. It can be seen that too low gas pressure (less than 50 Pa) or too high gas pressure (greater than 350 Pa) will introduce a lot of interference except the molecular ion peak of the mass spectrogram, which is not conducive to the analysis of the spectrogram.

In conclusion, a sample desorption and ionization device, and a mass spectrometer and an analysis method applying the same in the present disclosure can significantly improve the introduction efficiency of ions and an applicable range of analytes in direct mass spectrometry analysis after the analytes are ionized, effectively overcome various defects in the prior art, and have high industrial utilization value.

The above embodiments merely exemplify the principles and effects of the present disclosure, but are not intended to limit the present disclosure. A person skilled in the art can modify or change the above embodiments without departing from the spirit and scope of the present disclosure. Therefore, all equivalent modifications or changes made by those of ordinary skill in the art without departing from the spirit and technical ideas disclosed by the present disclosure should fall within the scope of the claims of the present disclosure.

What is claimed is:

1. A sample desorption and ionization device, having a first gas pressure region and a second gas pressure region, wherein the gas pressure in the first gas pressure region is higher than the gas pressure in the second gas pressure region; the device comprises:
   a heating desorption device, disposed in the first gas pressure region, carrying and heating a sample, wherein an analyte in the sample is desorbed from the sample under a heating action and then enters the first gas pressure region;
   a vacuum interface component, connected with the first gas pressure region and the second gas pressure region, and causing the analyte to enter the second gas pressure region from the first gas pressure region, which is driven by a gas flow; and
   a soft ionization source, wherein the soft ionization source includes one of a glow discharge ionization source, a radiation ionization source and a dielectric barrier discharge ionization source, the soft ionization source converts gas molecules in the second gas pressure region into activated gas molecules, the analyte entering the second gas pressure region interacts with the activated gas molecules and realizes soft ionization, and the gas pressure in the second gas pressure region is 50-350 Pa.

2. The device as in claim 1, wherein the heating desorption device heats the sample by adopting hot solid surface assisted desorption or hot gas assisted desorption.

3. The device as in claim 2, wherein the heating desorption device desorbs the analyte from the sample directly via thermal desorption by using a heating block, a heating tray, a heating rod or heating wires.

4. The device as in claim 2, wherein the heating desorption device adopts a combination of a sample tray and a gas heater aligned to the sample tray, and the sample is in contact with the gas heated by the gas heater to realize thermal desorption of the analyte.

5. The device as in claim 1, wherein the heating desorption device adopts a laser device, and the sample is in contact with a laser light emitted by the laser device to realize photodesorption of the analyte.

6. The device as in claim 1, wherein the heating desorption device heats the sample based on temperature programming.

7. The device as in claim 1, wherein the vacuum interface component comprises a metal tube and a metal sleeve, wherein one end of the metal tube is disposed in the first gas pressure region, the other end of the metal tube is inserted in one end of the metal sleeve and extends into the metal sleeve, the other end of the metal sleeve has an opening, and the second gas pressure region is in a barrel of the metal sleeve.

8. The device as in claim 7, wherein the vacuum interface component further includes an insulating sleeve, the insulating sleeve is disposed between the metal tube and the metal sleeve to isolate the metal tube from the metal sleeve, and the metal sleeve is connected with a casing of the device to realize grounding.

9. The device as in claim 7, wherein a sleeve wall of the metal sleeve includes an opening for radiation of the radiation ionization source to enter, and the radiation enters the inside of the metal sleeve through the opening and then enters the second gas pressure region.

10. The device as in claim 1, wherein the vacuum interface component comprises a quartz tube and a quartz sleeve, wherein one end of the quartz tube is disposed in the first gas pressure region, the other end of the quartz tube is inserted in one end of the quartz sleeve and extends into the quartz sleeve, the other end of the quartz sleeve has an opening, and the second gas pressure region is in a barrel of the quartz sleeve.

11. The device as in claim 10, wherein the soft ionization source adopts a dielectric barrier discharge ionization source.

12. The device as in claim 10, wherein the soft ionization source adopts a radiation ionization source, a sleeve wall of the quartz sleeve includes an opening for radiation of the radiation ionization source to enter, and the radiation enters the inside of the quartz sleeve through the opening and then enter the second gas pressure region.

13. The device as in claim 7, wherein a gas pressure in the second gas pressure region is adjusted by adjusting a size of the opening of the metal sleeve.

14. The device as in claim 10, wherein a gas pressure in the second gas pressure region is adjusted by adjusting a size of the opening of the quartz sleeve.

15. The device as in claim 1, wherein a gas in the first gas pressure region contains oxygen or ozone, and the oxygen or the ozone is capable of entering the second gas pressure region with the gas flow.

16. The device as in claim 1, wherein a gas pressure in the first gas pressure region adopts: 1/10 atmospheric pressure to 1/5 atmospheric pressure, 1/5 atmospheric pressure to 1/4 atmospheric pressure, 1/4 atmospheric pressure to 1/3 atmospheric pressure, 1/3 atmospheric pressure to 1/2 atmospheric pressure, or 1/2 atmospheric pressure to 1 atmospheric pressure.

17. The device as in claim 1, wherein the gas pressure in the second gas pressure region is: 50-100 Pa, 100-150 Pa, 150-200 Pa, 200-250 Pa, 250-300 Pa or 300-350 Pa.

18. A mass spectrometer, comprising: the sample desorption and ionization device as in claim 1, an ion guiding vacuum chamber, ion guiding devices, mass analyzers and an ion detector, wherein one end of a second gas pressure region is communicated with the ion guiding vacuum chamber, and a gas pressure in the second gas pressure region is not less than a gas pressure in the ion guiding vacuum chamber.

19. The mass spectrometer as in claim 18, wherein the gas pressure in the second gas pressure region is adjusted by adjusting a size of an opening of a metal sleeve or a size of an opening of a quartz sleeve, when the opening gradually becomes large, the gas pressure in the second gas pressure region gradually tends to a gas pressure in the ion guiding vacuum chamber; and when the opening gradually becomes small, a value of the gas pressure in the second gas pressure region gradually increases.

20. A sample desorption and ionization method applied to the sample desorption and ionization device as in claim 1, comprising:

heating a sample in a first gas pressure region, an analyte in the sample is desorbed from the sample under a heating action and then enters the first gas pressure region;

causing the analyte to enter a second gas pressure region from the first gas pressure region, which is driven by a gas flow, wherein a gas pressure in the first gas pressure region is higher than a gas pressure in the second gas pressure region; and converting gas molecules in the second gas pressure region into activated gas molecules, the analyte entering the second gas pressure region realizes soft ionization after interacting with the activated gas molecules.

21. A sample analysis method based on the mass spectrometer as in claim 18, comprising:

heating a sample positioned in a first gas pressure region, wherein an analyte in the sample is desorbed from the sample under a heating action and then enters the first gas pressure region;

causing the analyte to enter a second gas pressure region from the first gas pressure region under a drive of a gas flow, wherein a gas pressure in the first gas pressure region is higher than a gas pressure in the second gas pressure region;

converting gas molecules in the second gas pressure region into activated gas molecules, wherein the analyte entering the second gas pressure region realizes soft ionization after interacting with the activated gas molecules, the gas pressure in the second gas pressure region is 50-350 Pa; and causing ions of the analyte to enter ion guide devices under an action of a gas flow and an electric field, and then, screening the ions by the mass analyzers to reach an ion detector for analysis.

* * * * *